(12) United States Patent
Tsai (10) Patent No.: US 10,046,826 B2
(45) Date of Patent: Aug. 14, 2018

(54) DUAL CONTROL LEVER AND BICYCLE CONTROL ASSEMBLY

(71) Applicant: TEKTRO TECHNOLOGY CORPORATION, Sioushuei Township, Changhua County (TW)

(72) Inventor: Szu-Fang Tsai, Taichung (TW)

(73) Assignee: TEKTRO TECHNOLOGY CORPORATION, Changhua County (TW)

( * ) Notice: Subject to any disclaimer, the term of this patent is extended or adjusted under 35 U.S.C. 154(b) by 105 days.

(21) Appl. No.: 14/838,238

(22) Filed: Aug. 27, 2015

(65) Prior Publication Data

US 2017/0057590 A1    Mar. 2, 2017

(51) Int. Cl.
*B62K 23/06* (2006.01)
*B62L 3/02* (2006.01)
*B62M 25/08* (2006.01)

(52) U.S. Cl.
CPC ............... *B62K 23/06* (2013.01); *B62L 3/02* (2013.01); *B62M 25/08* (2013.01)

(58) Field of Classification Search
CPC ........ B62K 11/14; B62K 21/12; B62K 23/02; B62K 23/06; B62L 3/02; B62M 25/04; B62M 25/08; Y10T 74/20438
See application file for complete search history.

(56) References Cited

U.S. PATENT DOCUMENTS

| | | | | |
|---|---|---|---|---|
| 5,577,969 | A * | 11/1996 | Watarai | B62M 9/122 474/78 |
| 6,146,297 | A * | 11/2000 | Kimura | B62M 25/08 280/238 |
| 6,400,564 | B1 * | 6/2002 | Nishimoto | B62J 99/00 188/24.11 |
| 7,124,873 | B2 * | 10/2006 | Tsumiyama | B62L 3/023 192/217 |
| 7,204,169 | B2 * | 4/2007 | Mitchell | B62K 23/04 74/489 |
| 7,350,436 | B2 * | 4/2008 | Fujii | B62K 23/04 280/261 |
| 7,354,320 | B2 * | 4/2008 | Onogi | B62J 6/18 280/288.4 |
| 7,363,873 | B2 * | 4/2008 | Iteya | B62J 6/00 116/28.1 |
| 7,522,033 | B2 * | 4/2009 | Takamoto | B62M 25/08 340/425.5 |
| 7,651,423 | B2 * | 1/2010 | Ichida | B62K 23/06 188/15 |
| 7,891,687 | B2 * | 2/2011 | Schmider | B62K 19/30 280/281.1 |
| 8,608,354 | B2 * | 12/2013 | Tsai | B62J 6/16 362/473 |

(Continued)

FOREIGN PATENT DOCUMENTS

DE    2619075 B1 *  9/1977 ............. B62J 17/00

*Primary Examiner* — Adam D Rogers
(74) *Attorney, Agent, or Firm* — Maschoff Brennan (57) ABSTRACT

A bicycle stem includes a handlebar and a dual control lever which includes a brake device and a first electronic sending unit. The first electronic sending unit is detachably fixed to the brake device. The brake device and the first electronic sending unit together form an assembly space for a handlebar installed therein. The handlebar is assembled with the brake device and the first electronic sending unit in the assembly space.

12 Claims, 6 Drawing Sheets

(56) References Cited

U.S. PATENT DOCUMENTS

| | | | | |
|---|---|---|---|---|
| 8,960,379 B2* | 2/2015 | Coombes | ............... | B62L 3/04 |
| | | | | 188/24.11 |
| 9,008,923 B2* | 4/2015 | Takamoto | ............. | B62M 25/00 |
| | | | | 474/116 |
| 9,151,379 B2* | 10/2015 | Kuroda | ............... | B62M 25/04 |
| 9,191,038 B2* | 11/2015 | Abe | ..................... | G08C 17/00 |
| 9,511,815 B2* | 12/2016 | Hirotomi | .............. | B62K 23/06 |
| 2006/0260428 A1* | 11/2006 | Kawakami | ............ | B62K 23/06 |
| | | | | 74/502.2 |
| 2007/0012137 A1* | 1/2007 | Dal Pra' | ............... | B62K 23/06 |
| | | | | 74/502.2 |
| 2009/0158881 A1* | 6/2009 | Shahana | ............... | B62K 23/06 |
| | | | | 74/502 |
| 2011/0148611 A1* | 6/2011 | Ni | ............................ | B62J 6/04 |
| | | | | 340/432 |
| 2012/0200061 A1* | 8/2012 | D'Aluisio | ............... | B62L 3/02 |
| | | | | 280/281.1 |
| 2012/0265413 A1* | 10/2012 | Lin | ....................... | B62K 23/06 |
| | | | | 701/51 |
| 2014/0252746 A1* | 9/2014 | Talavasek | ............. | B62K 21/12 |
| | | | | 280/288.4 |
| 2015/0135881 A1* | 5/2015 | Dal Pra | .................. | B62L 3/023 |
| | | | | 74/491 |
| 2015/0203169 A1* | 7/2015 | Nishino | ................ | B62K 23/06 |
| | | | | 74/491 |
| 2015/0291247 A1* | 10/2015 | Fukao | ................... | B62K 23/06 |
| | | | | 74/473.14 |
| 2016/0039485 A1* | 2/2016 | Esquibel | ............... | B62K 19/30 |
| | | | | 224/420 |
| 2016/0195933 A1* | 7/2016 | Yang | .................... | B62K 23/06 |
| | | | | 345/156 |
| 2016/0257370 A1* | 9/2016 | Hashimoto | ........... | B62M 25/08 |

\* cited by examiner

DUAL CONTROL LEVER AND BICYCLE CONTROL ASSEMBLY

BACKGROUND

Technical Field

The disclosure relates to a dual control lever having the same. More particularly, the disclosure relates to a dual control lever including a brake device and a first electronic sending unit which are separable from each other.

Background

In recent years, bicycles are popular for users to ride in bicycle races or their daily lives. Generally speaking, bicycles are usually equipped with a electronic sending unit for shifting a chain to different cassettes (i.e., sprockets) according to different topographic features or requirements. Moreover, some electronic sending units and brake devices are integrally formed into one single component.

SUMMARY

One aspect of the disclosure provides a dual control lever, which includes a brake device and a first electronic sending unit. The first electronic sending unit is detachably fixed to the brake device. The brake device and the first electronic sending unit together form an assembly space for a handlebar installed therein.

Another aspect of the disclosure provides a bicycle control assembly, which includes a handlebar and the dual control lever. The handlebar is assembled with the brake device and the first electronic sending unit in the assembly space.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1:
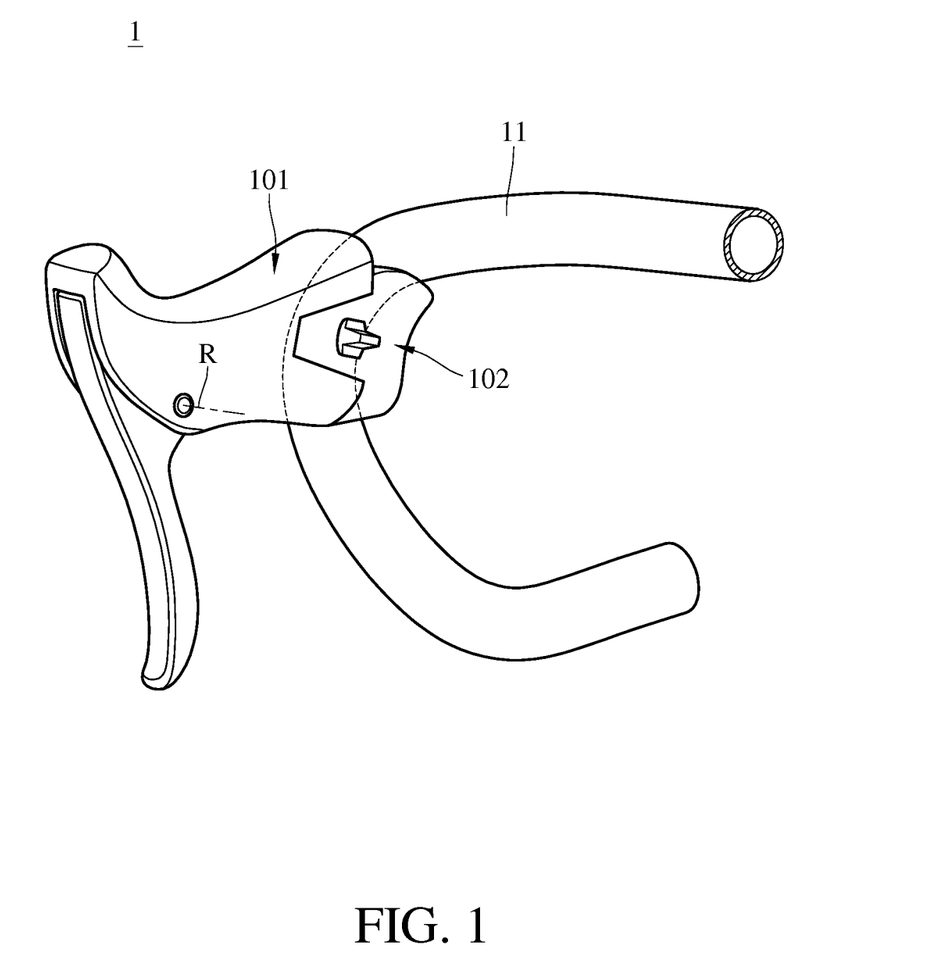
FIG. 1 is a perspective view of a bicycle control assembly from a first viewpoint according to a first embodiment of the disclosure.
Figure 2:
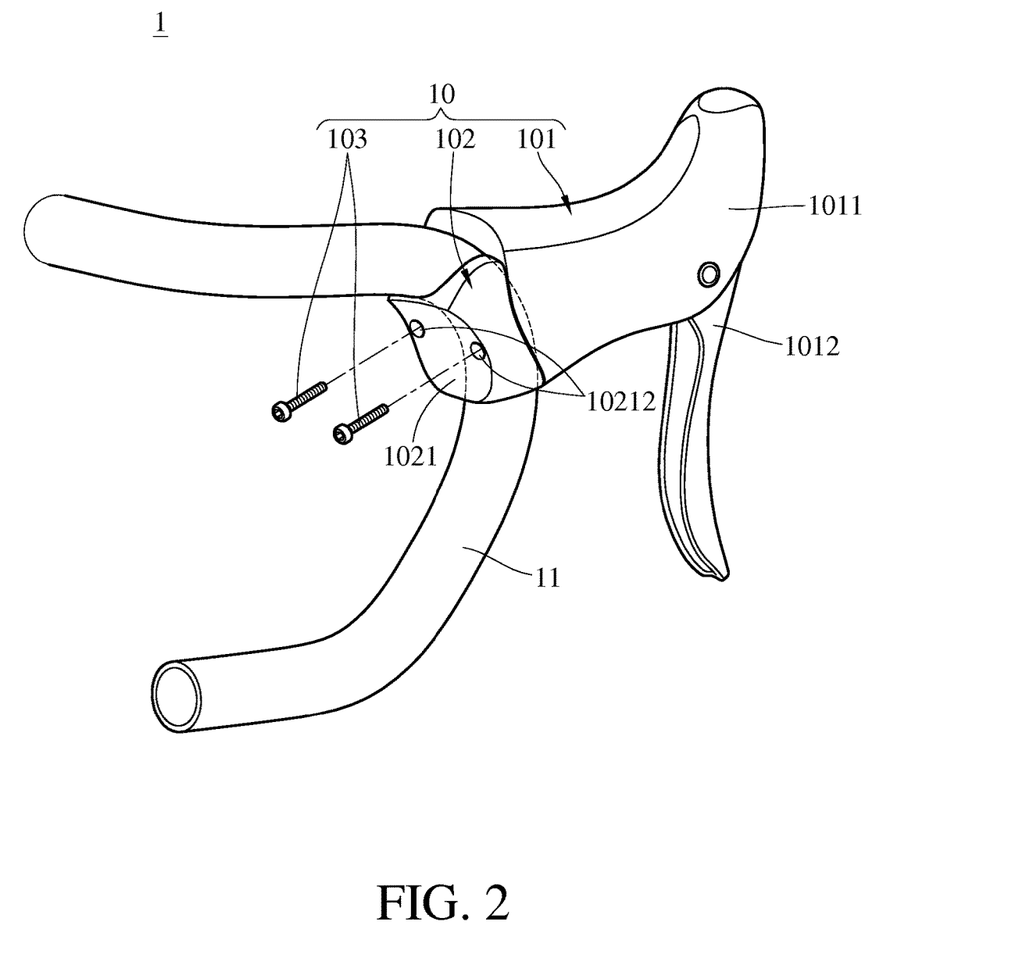
FIG. 2 is a perspective view of the bicycle control assembly from a second viewpoint according to the first embodiment of the disclosure.
Figure 3:
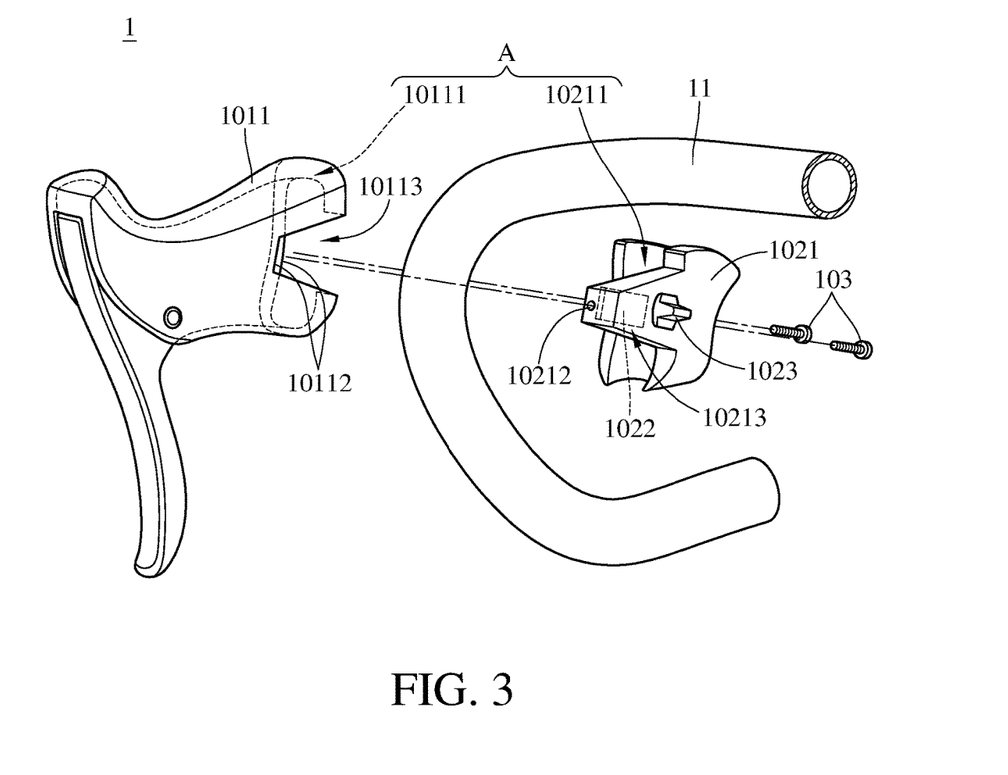
FIG. 3 is an exploded view of the bicycle control assembly in FIG. 1.

Please refer to FIG. 1 through FIG. 3. FIG. 1 is a perspective view of a bicycle control assembly from a first viewpoint according to a first embodiment of the disclosure. FIG. 2 is a perspective view of the bicycle control assembly from a second viewpoint according to the first embodiment of the disclosure. FIG. 3 is an exploded view of the bicycle control assembly in FIG. 1. As shown in figures, the bicycle control assembly 1 includes a dual control lever 10 and a handlebar 11.

In this embodiment, the dual control lever 10 includes a brake device 101, a first electronic sending unit 102 and two fixing components 103. The brake device 101 includes a fixed base 1011 and a brake lever 1012. The fixed base 1011 has a first cavity 10111, two fixed parts 10112 and a slot 10113 which is connected to the first cavity 10111. Moreover, for example, the two fixed parts 10112 are two screw holes in this embodiment.

The brake lever 1012 is pivoted on the fixed base 1011. When a user presses the brake lever 1012, the brake lever 1012 is driven to rotate relative to the fixed base 1011 about a rotation axis R as a central line of rotation. Accordingly, brake components (not shown in figures) are driven to move correspondingly to brake stop rotations of wheels of the bicycle.

The first electronic sending unit 102 includes a housing 1021, a circuit unit 1022 and an electrical trigger 1023. The housing 1021 has a second cavity 10211, two through holes 10212 and a tongue 10213. The housing 1021 is fixed to the fixed base 1011 by the two fixing components 103, such that the first electronic sending unit 102 is detachably fixed to the brake device 101, and the brake device 101 and the first electronic sending unit 102 together form an assembly space A. The handlebar 11 is assembled with the brake device 101 and the first electronic sending unit 102 in the assembly space A. In other words, a part of the handlebar 11 is interposed between the brake device 101 and the first electronic sending unit 102. Specifically, the two fixing component 103 is fixed to the two fixed parts 10112 of the fixed base 1011 of the brake device 101 via the two through holes 10212 of the housing 1021 of the first electronic sending unit 102, such that the first electronic sending unit 102 is detachably fixed to the brake device 101. The two fixing components 103 match with the two fixed parts 10112. That is, for example, the two fixing components 103 are two screws in this embodiment. In addition, the tongue 10213 is the same as the shape of the slot 10113 of the fixed base 1011.

Figure 4:
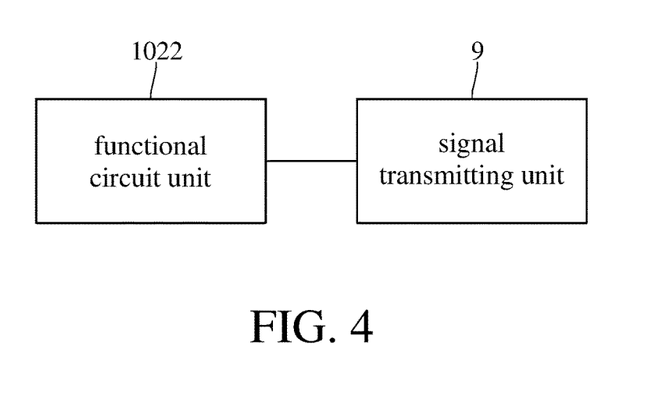
FIG. 4 is a block diagram of a circuit unit which is electrically connected to the signal transmitting unit according to the first embodiment of the disclosure.

The circuit unit 1022 is disposed at the housing 1021. The electrical trigger 1023 is also disposed at housing 1021, for triggering the circuit unit. Specifically, the circuit unit 1022 is disposed in the tongue 10213 and the electrical trigger 1023 is disposed on the tongue 10213. Please refer to FIG. 4 at the same time. FIG. 4 is a block diagram of a circuit unit which is electrically connected to the signal transmitting unit according to the first embodiment of the disclosure. As shown in FIG. 4, the circuit unit 1022 is electrically connected to a signal transmitting unit 9. The signal transmitting unit 9, for example, is electrically connected to a front derailleur or a rear derailleur by a wired or wireless medium. When the circuit unit 1022 is triggered, a speed change signal is transmitted to the signal transmitting unit 9 from the circuit unit 1022. The speed change signal is, but not limited to, a first control signal for shifting an half speed step.

For example, when the electrical trigger 1023 is adjusted upward by the user, the first control signal is transmitted to the signal transmitting unit 9 from the circuit unit 1022, for driving a front electronic sending unit (not shown in figures) to shift the half speed step. When a chain is meshed with a smaller chain ring (not shown in figures) and a smaller cassette (not shown in figures), or when the chain is meshed with a larger chain ring (not shown in figures) and a larger cassette (not shown in figures), the chain is tilted and may be interfered with the front electronic sending unit, the rear electronic sending unit or gears (not shown in figures). The purpose of shifting an half speed step is to make the chain close to the larger chain ring, for decreasing the chance of interference between each component. Moreover, when the electrical trigger 1023 is adjusted downward by the user, a second control signal for shifting up one speed step is transmitted to the signal transmitting unit 9 from the circuit unit 1022.

Since the first electronic sending unit 102 is detachably fixed to the brake device 101, when the brake device 101 or the first electronic sending unit 102 is broken, the user does not need to change or repair the brake device 101 and the first electronic sending unit 102 at the same time. For example, when the brake device 101 is broken, the user only needs to change or repair the brake device 101 without disassembling the first electronic sending unit 102, and vise versa. Additionally, since the brake device 101 and the first electronic sending unit 102 can be separated from each other, when the brake device 101 is a hydraulic brake device, the hydraulic oil inside the hydraulic brake device does not interfere with the components disposed inside the first electronic sending unit 102 (such as oil leakage).

Moreover, since the handlebar 11 is interposed between the brake device 101 and the first electronic sending unit 102, the positions of the brake device 101 and the first electronic sending unit 102 relative to the handlebar 11 are adjustable. Please refer to FIG. 5A and FIG. 5B which are perspective views of a dual control lever in FIG. 1 which is adjustable relative to a handlebar.

Figure 5A:
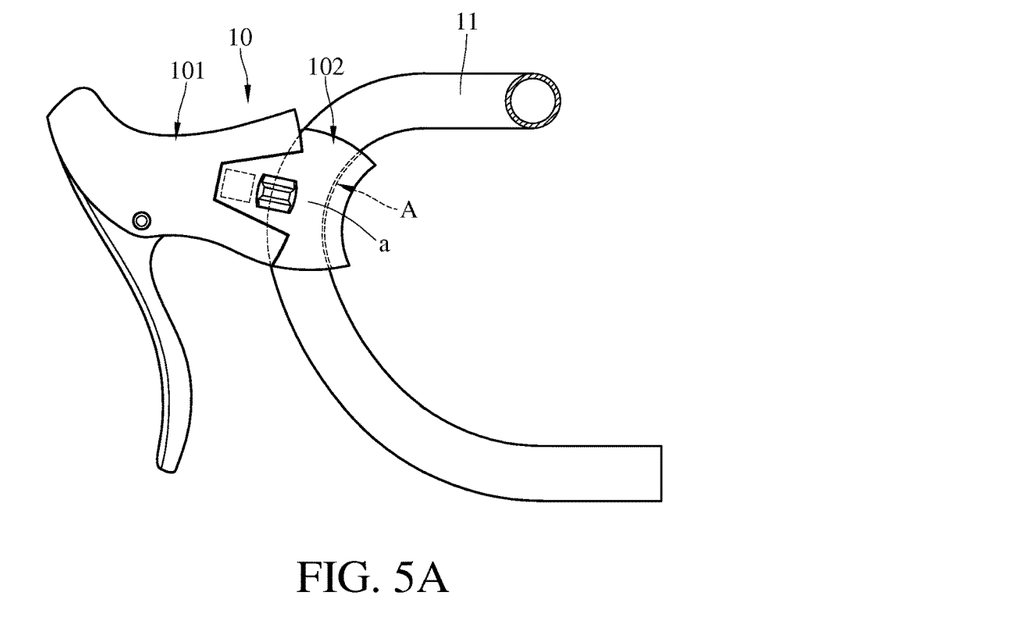
FIG. 5A and FIG. 5B are perspective views of a dual control lever in FIG. 1 which is adjustable relative to a handlebar.
Figure 5B:
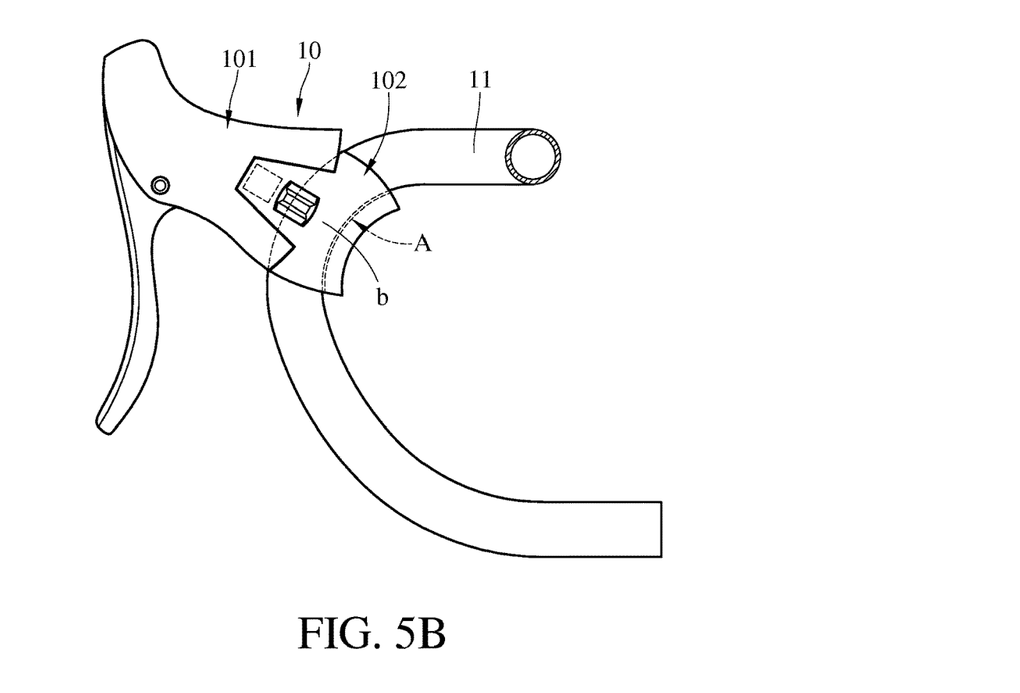

As shown in FIG. 5A, the dual control lever 10 is assembled with a section a on the handlebar 11. When the user wants to change the position of the dual control lever 10 relative to the handlebar 11, first, the user can separate the first electronic sending unit 102 from the brake device 101 before separate the brake device 101 from the handlebar 11. Then, as shown in FIG. 5B, the user can move and install the brake device 101 on a section b on the handlebar 11, and then fix the first electronic sending unit 102 to the brake device 101. At this time, the assembly space A is formed at the section b on the handlebar 11. Accordingly, the position of the dual control lever 10 relative to the handlebar 11 is changed.

A second embodiment of the disclosure will be described as follows. Please refer to FIG. 6 which is a perspective view of a bicycle control assembly from the second viewpoint according to a second embodiment of the disclosure. Different from the first embodiment, in this embodiment, the dual control lever 20 of the bicycle control assembly 2 further includes a connecting component 204, and the quantity of through hole 20212 of the housing 2021 is one.

Figure 6:
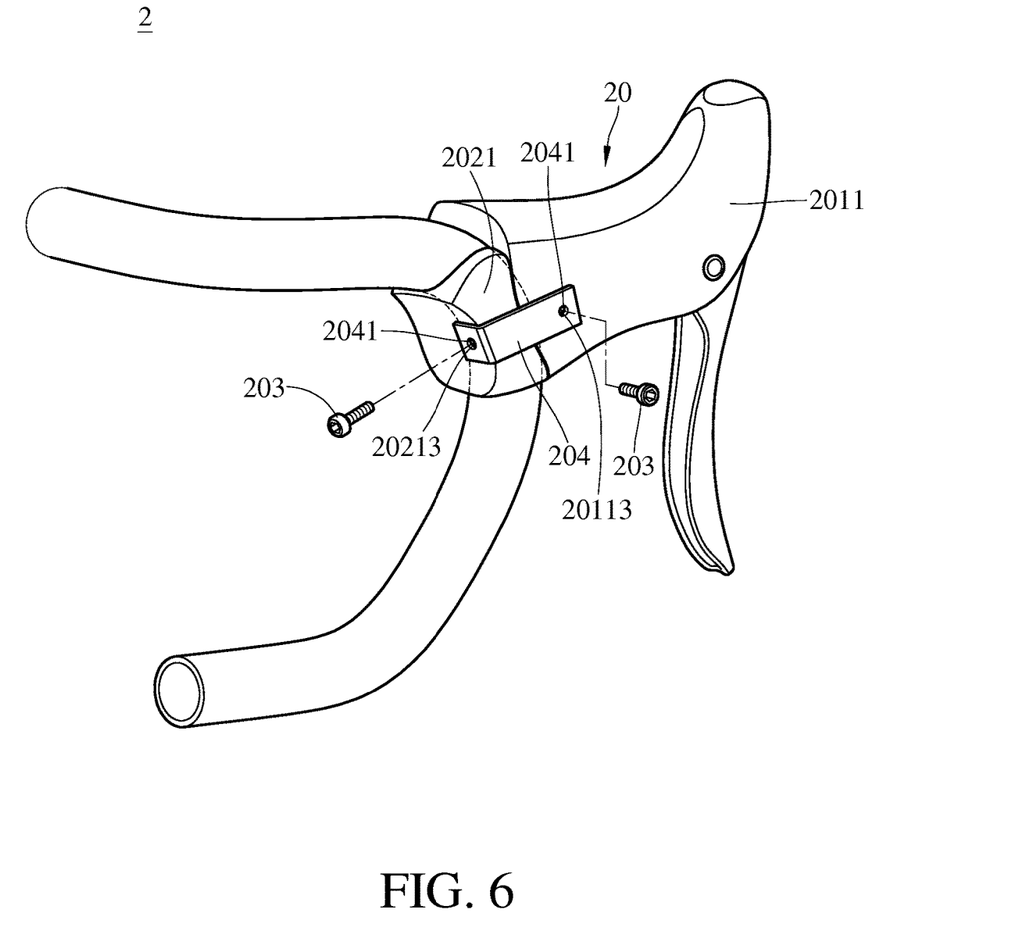
FIG. 6 is a perspective view of a bicycle control assembly from a second viewpoint according to a second embodiment of the disclosure.

The connecting component 204 has two ends which are opposite to each other. One end of the connecting component 204 is connected to the housing 2021, and the other end of the connecting component 204 is connected to the fixed base 2011. Moreover, the connecting component 204 has two through holes 2041. One fixing component 203 is fixed to the first fixed part 20113 of the fixed base 2011 via one of the through holes 2041 of the connecting component 204. The other fixing component 203 is fixed to the second fixed part 20213 of the fixed base 2011 via the other through hole 2041 of the connecting component 204. In this embodiment, the quantity of the fixing component 203 fixed to the housing 2021 is decreased, such that there is more space provided for the components disposed inside the housing 2021 (such as the circuit unit as shown in FIG. 4) so as not to be interfered with the fixing component 203.

Since the bicycle control assembly 2 according to this embodiment is similar to the bicycle control assembly 1 according to the first embodiment, other components or conditions, which are not mentioned in this embodiment, are similar to the first embodiment (i.e., FIG. 1 through FIG. 5B), such that they will not be repeated again.

A third embodiment of the disclosure will be described as follows. Please refer to FIG. 7 which is a perspective view of a bicycle control assembly according to the third embodiment of the disclosure. Different from the first embodiment, in this embodiment, the dual control lever 30 of the bicycle control assembly 3 further includes a second electronic sending unit 304.

Figure 7:
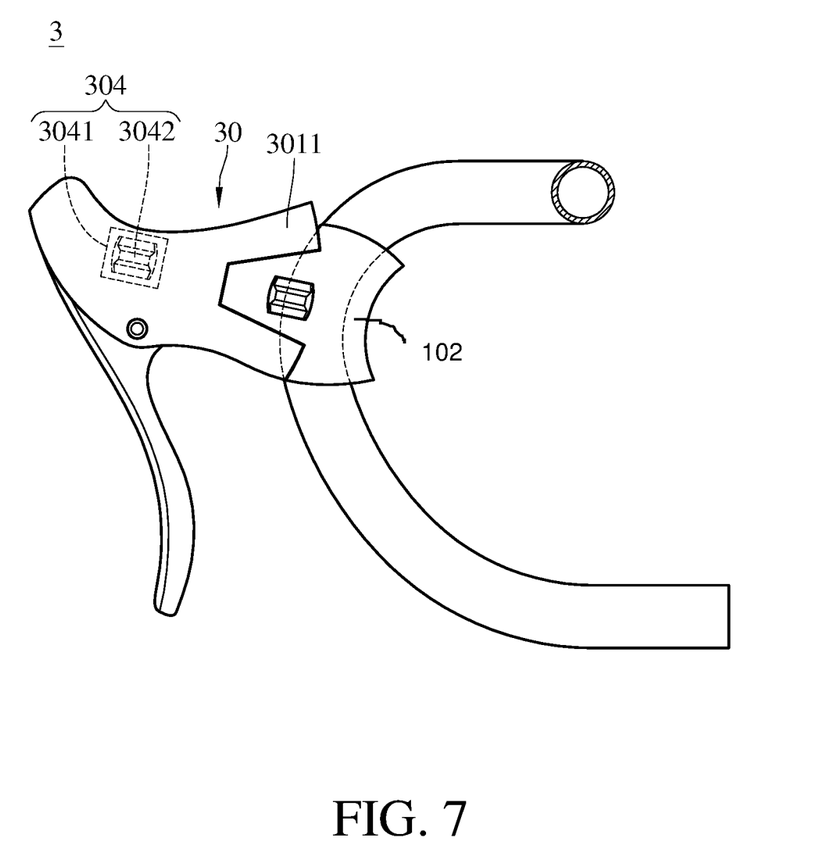
FIG. 7 is a perspective view of a bicycle control assembly according to a third embodiment of the disclosure.

The second electronic sending unit 304 is fixed to the fixed base 3011 and includes a circuit unit 3041 and an electrical trigger 3023. The circuit unit 3041 of the second electronic sending unit 304 also can transmit the speed change signal to the signal transmitting unit 9 as shown in FIG. 4. The speed change signal is, but not limited to, a control signal for shifting up one speed step. Additionally, the position of the second electronic sending unit 304 and the function of the circuit unit 3041 of the second electronic sending unit 304 can be changed according to the requirements of the user and the disclosure is not limited thereto.

Since the bicycle control assembly 3 according to this embodiment is similar to the bicycle control assembly 1 according to the first embodiment, other components or conditions, which are not mentioned in this embodiment, are similar to the first embodiment (please refer to FIG. 1 through FIG. 5B), such that they will not be repeated again.

To sum up, since the first electronic sending unit is detachably fixed to the brake device, when the brake device is broken, the user can change or repair the broken brake device solely without changing or repairing the well-operated first electronic sending unit at the same time, and vise versa. Additionally, since the brake device and the first electronic sending unit can be separated from each other, when the brake device is a hydraulic brake device, the hydraulic oil inside the hydraulic brake device does not interfere with the components disposed inside the first electronic sending unit. Furthermore, in some embodiments, the dual control lever further includes the connecting component, and the brake device and the connecting component are connected to each other by the connecting component. Accordingly, there is more space for the components disposed inside the housing without being interfered with the fixing component. In some embodiments, the dual control lever further includes the second electronic sending unit. The position of the second electronic sending unit and the function of the circuit unit of the second electronic sending unit can be changed according to requirements of users.

The disclosure will become more fully understood from the said embodiment for illustration only and thus does not limit the disclosure. Any modifications within the spirit and category of the disclosure fall in the scope of the disclosure.

What is claimed is:

1. A dual control lever adapted for a handlebar, comprising:
   a brake device; and
   a first electronic sending unit detachably fixed to the brake device, and the brake device and the first electronic sending unit together forming an assembly space for the handlebar installed therein,
   wherein the brake device comprises a fixed base and a brake lever, the brake lever is pivoted on the fixed base, the fixed base has a slot, the first electronic sending unit comprises a housing, a circuit unit and an electrical trigger, the housing has a tongue which is the same as the shape of the slot of the fixed base, the electrical trigger is disposed on the tongue, and the circuit unit is disposed in the tongue.

2. The dual control lever according to claim 1, wherein the fixed base has a first cavity connected to the slot, and the housing has a second cavity, the assembly space is formed by the first cavity and the second cavity.

3. The dual control lever according to claim 2, wherein the electrical trigger triggers the circuit unit to transmit a speed change signal.

4. The dual control lever according to claim 3, further comprising a signal transmitting unit electrically connected to the circuit unit, for receiving the speed change signal.

5. The dual control lever according to claim 2, further comprising a fixing component, the housing further having a through hole, the fixed base further having a fixed part, the fixing component is fixed to the fixed part of the fixed base via the through hole of the housing.

6. The dual control lever according to claim 2, further comprising a connecting component and two fixing components, the housing further having two through holes, the fixed base further having a first fixed part, the housing has a second fixed part, the two fixing components are fixed to the first fixed part and the second fixed part via the two through holes, respectively.

7. The dual control lever according to claim 2, further comprising a second electronic sending unit fixed to the fixed base of the brake device.

8. A bicycle control assembly, comprising:
   a handlebar; and
   a dual control lever, comprising:
      a brake device; and
   a first electronic sending unit detachably fixed to the brake device, and the brake device and the first electronic sending unit together forming an assembly space the handlebar being assembled with the brake device and the first electronic sending unit in the assembly space,
   wherein the brake device comprises a fixed base and a brake lever, the brake lever is pivoted on the fixed base, the fixed base has a slot, the first electronic sending unit comprises a housing, a circuit unit and an electrical trigger, the housing has a tongue which is the same as the shape of the slot of the fixed base, the electrical trigger is disposed on the tongue, and the circuit unit is disposed in the tongue.

9. The bicycle control assembly according to claim 8, wherein the fixed base has a first cavity connected to the slot, the housing has a second cavity, and the assembly space is formed by the first cavity and the second cavity.

10. The bicycle control assembly according to claim 9, wherein the electrical trigger triggers the circuit unit to transmit a speed change signal.

11. The bicycle control assembly according to claim 10, further comprising a signal transmitting unit electrically connected to the circuit unit, for receiving the speed change signal.

12. The bicycle control assembly according to claim 9, further comprising a second electronic sending unit fixed to the fixed base of the brake device.

* * * * *